(12) United States Patent
Lin

(10) Patent No.: US 9,904,041 B2
(45) Date of Patent: *Feb. 27, 2018

(54) PROJECTION LENS AND PROJECTION DEVICE THEREOF

(71) Applicants: QISDA OPTRONICS (SUZHOU) CO., LTD., Suzhou, Jiangsu Province (CN); QISDA CORPORATION, Taoyuan (TW)

(72) Inventor: Ming-Kuen Lin, Taoyuan (TW)

(73) Assignees: Qisda Optronics (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,372

(22) Filed: Jul. 26, 2016

(65) Prior Publication Data

US 2017/0038565 A1   Feb. 9, 2017

(30) Foreign Application Priority Data

Aug. 4, 2015   (TW) .............................. 104125162 A

(51) Int. Cl.
*G02B 13/16* (2006.01)
*G02B 13/18* (2006.01)
*G02B 9/60* (2006.01)

(52) U.S. Cl.
CPC ............... *G02B 13/16* (2013.01); *G02B 9/60* (2013.01); *G02B 13/18* (2013.01)

(58) Field of Classification Search
CPC ..... G02B 9/60; G02B 9/62; G02B 9/64; G02B 13/0045; G02B 13/16; G02B 13/18
USPC ........ 359/649, 708–714, 754–756, 761–763, 359/770
See application file for complete search history.

(56) References Cited

U.S. PATENT DOCUMENTS

2014/0029119 A1*  1/2014  Chou ................... G02B 13/18
                                                         359/717
2014/0327888 A1   11/2014  Kawana

FOREIGN PATENT DOCUMENTS

JP            2010113150 A       5/2010

* cited by examiner

*Primary Examiner* — Darryl J Collins

(57) ABSTRACT

A projection lens is applied to image projection of a projection device including an imaging unit. The projection lens includes a first lens group with a negative diopter and a second lens group with a positive diopter. The first lens group has a first lens having a first negative diopter. The second lens group is adjacent to the imaging unit and includes second, third, fourth, and fifth lenses. The second lens has a second negative diopter. The third and fourth lenses are between the first and second lenses. The fifth lens is between the imaging unit and the second lens and is an aspherical lens. A refractive index of the first lens is less than or equal to 1.64. An ABBE number of the first lens represents $V_{d1}$, an ABBE number of the second lens represents $V_{d2}$, $0.4 \leq V_{d2}/V_{d1} \leq 1.2$, and $V_{d1} < 50$.

12 Claims, 5 Drawing Sheets

PROJECTION LENS AND PROJECTION DEVICE THEREOF

BACKGROUND OF THE INVENTION

1. Field of the Invention

The present invention relates to a projection lens and a projection device thereof, and more specifically, to a projection lens having a short throw function and a projection device thereof.

2. Description of the Prior Art

With development of technology, a projection device has been commonly used for presenting image information in a meeting. Due to limited space of a meeting room, a projection device having a projection lens with an ultra-short focal length is widely applied to image projection since it is convenient to carry as well as easy to adjust its focus. A conventional lens mechanism of short throw projectors is composed of two lens groups including five lenses. In this design, one lens group close to a projection screen has a negative diopter for diverging light, and the other lens group away from the projection screen has a positive diopter for converging light. However, this design usually needs to utilize an aspherical lens with a high cost to eliminate lateral color aberration of light, so as to greatly increase the manufacturing cost of the short throw lens mechanism. Thus, how to reduce the manufacturing cost of the short throw lens mechanism and further eliminate lateral color aberration of light is one of the major issues in the optical lens industry.

SUMMARY OF THE INVENTION

The present invention provides a projection lens applied to image projection of a projection device. The projection device is used for projecting images to a screen and includes an imaging unit. The projection lens includes a first lens group and a second lens group. The first lens group has a negative diopter. The first lens group is adjacent to the screen and has a first lens. The first lens has a first negative diopter. The second lens group has a positive diopter. The second lens group is adjacent to the imaging unit and includes a second lens, a third lens, a fourth lens, and a fifth lens. The second lens has a second negative diopter. The third lens and the fourth lens are located between the first lens and the second lens. The fifth lens is located between the imaging unit and the second lens. The fifth lens is an aspherical lens. A refractive index of the first lens is less than or equal to 1.64, an ABBE number of the first lens represents $V_{d1}$, an ABBE number of the second lens represents $V_{d2}$, $0.4 \leq V_{d2}/V_{d1} \leq 1.2$, and $V_{d1} < 50$.

The present invention further provides a projection device for projecting images to a screen. The projection device includes alight source, an imaging unit, and a projection lens. The light source is used for providing light. The imaging unit is used for receiving the light. The projection lens is disposed between the imaging unit and the screen for projecting the light to the screen. The projection lens includes a first lens group and a second lens group. The first lens group has a negative diopter. The first lens group is adjacent to the screen and has a first lens. The first lens has a first negative diopter. The second lens group has a positive diopter. The second lens group is adjacent to the imaging unit and comprising a second lens, a third lens, a fourth lens, and a fifth lens. The second lens has a second negative diopter. The third lens and the fourth lens are located between the first lens and the second lens. The fifth lens is located between the imaging unit and the second lens. The fifth lens is an aspherical lens. A refractive index of the first lens is less than or equal to 1.64, an ABBE number of the first lens represents $V_{d1}$, an ABBE number of the second lens represents $V_{d2}$, $0.4 \leq V_{d2}/V_{d1} \leq 1.2$, and $V_{d1} < 50$.

The present invention further provides a projection lens applied to image projection of a projection device. The projection device is used for projecting images to a screen and includes an imaging unit. The projection lens includes a first lens group and a second lens group. The first lens group has a negative diopter. The first lens group is adjacent to the screen and has a first lens. The first lens has a first negative diopter. The second lens group has a positive diopter. The second lens group is adjacent to the imaging unit and includes a second lens, a third lens, a fourth lens, and a fifth lens. The second lens has a second negative diopter. The third lens and the fourth lens are located between the first lens and the second lens. The fifth lens is located between the imaging unit and the second lens. A refractive power of the first lens is less than refractive powers of the second lens, the third lens, the fourth lens, and the fifth lens. An ABBE number of the first lens represents $V_{d1}$, an ABBE number of the second lens represents $V_{d2}$, $0.4 \leq V_{d2}/V_{d1} \leq 1.2$, and $V_{d1} < 50$.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
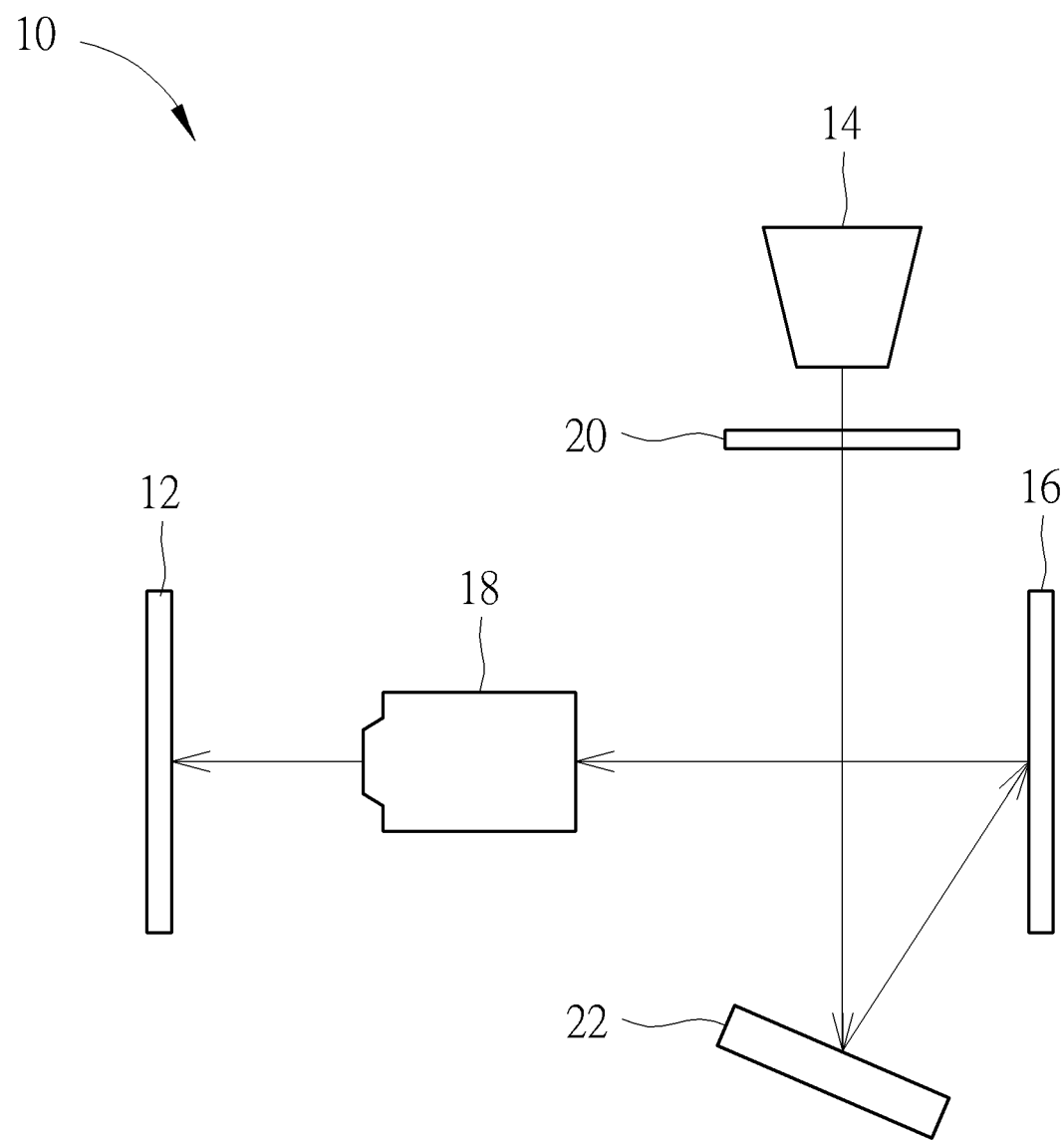
FIG. 1 is a diagram of a projection device according to an embodiment of the present invention.

Please refer to FIG. 1, which is a diagram of a projection device 10 according to an embodiment of the present invention. As shown in FIG. 1, the projection device 10 is used for projecting images to a screen 12 for image presentation. The projection device 10 includes a light source 14, an imaging unit 16, a projection lens 18, a filter unit 20, and a reflection member 22. The light source 14 outputs light, and the filter unit 20 filters the light into a plurality of color light. Subsequently, the light filtered by the filter unit 20 is reflected by the reflection member 22 and then received by the imaging unit 16. The imaging unit 16 transmits the plurality of color light reflected from the reflection member 22 to the projection lens 18. The projection lens 18 is disposed between the imaging unit 16 and the screen 12 for projecting the light transmitted from the imaging unit 16 to the screen 12. In a DLP (Digital Light Processing) projector, the filter unit 20 could be a color wheel, the imaging unit 16 could be a DMD (Digital Micromirror Device), and the reflection member 22 could be a concave lens. In an LCD (Liquid Crystal Display) projector, the filter unit 20 could be a filter sheet, the reflection member 22 could be a reflection mirror, and the imaging unit 16 could be an LCD panel.

Figure 2:
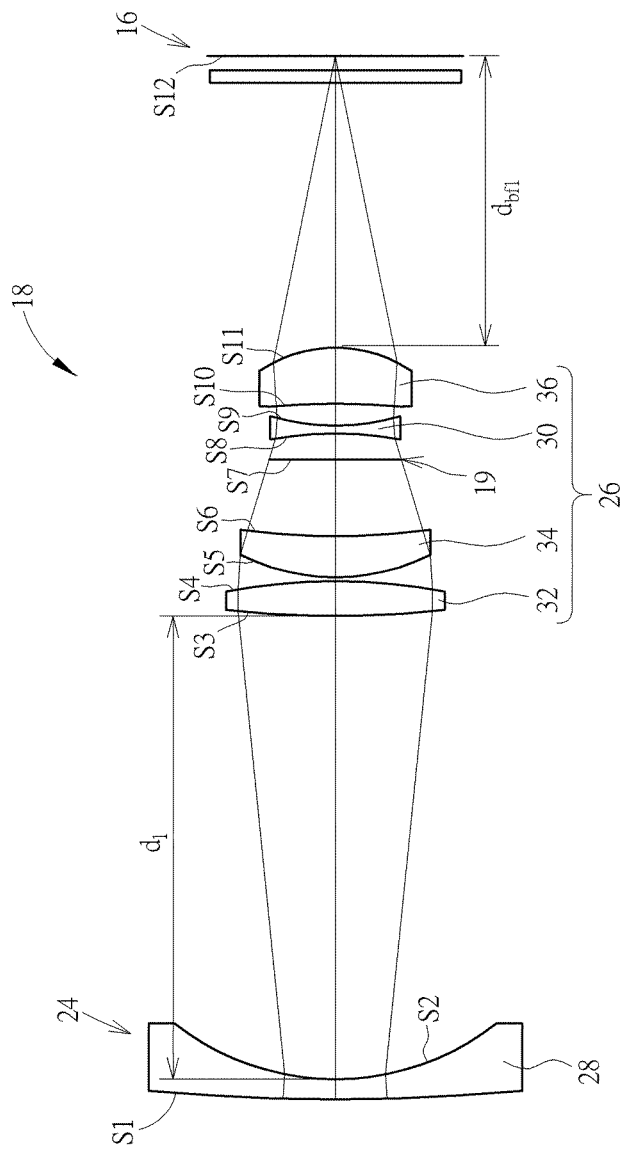
FIG. 2 is a component diagram of a projection lens in FIG. 1.

Please refer to FIG. 2, which is a component diagram of the projection lens 18 in FIG. 1. As shown in FIG. 2, the projection lens 18 includes a first lens group 24 and a second lens group 26. The first lens group 24 is adjacent to the screen 12, and the second lens group 26 is adjacent to the imaging unit 16. The first lens group 24 has a negative diopter for diverging light, and the second lens group 26 has a positive diopter for converging light. The first lens group 24 has a first lens 28. The first lens 28 has a negative diopter and could be a negative meniscus lens. The second lens group 26 includes a second lens 30. The second lens 30 has a negative diopter and could be a negative biconcave lens. In this embodiment, an ABBE number of the first lens 28 represents $V_{d1}$, an ABBE number of the second lens 30 represents $V_{d2}$, $0.4 \leq V_{d2}/V_{d1} \leq 1.2$, and $V_{d1} < 50$, so as to correct image distortion and eliminate lateral color aberration of light. In practical application, a refractive index of the second lens 30 could be preferably larger than or equal to 1.64 and less than or equal to 1.87, and the ABBE number $V_{d2}$ of the second lens 30 could be preferably larger than or equal to 20 and less than or equal to 35. Further, the second lens 30 could be preferably made of heavy flint-glass material with a high refractive index and a high ABBE number.

Furthermore, as shown in FIG. 2, the second lens group 26 further includes a third lens 32, a fourth lens 34, and a fifth lens 36. The third lens 32 and the fourth lens 34 are located between the first lens 28 and the second lens 30. The fifth lens 36 is located between the imaging unit 16 and the second lens 30. In this embodiment, the fifth lens 36 close to the imaging unit 16 could be preferably an aspherical lens made of glass material for generating the heat resistant effect and eliminating lateral color aberration of light, but not limited thereto. In summary, in the present invention, the projection lens 18 is composed of two lens groups including one negative meniscus lens (i.e. the first lens 28), one negative biconcave lens (i.e. the second lens 30), and three positive lenses having positive diopters (i.e. the third lens 32, the fourth lens 34, and the fifth lens 36). Table 1 shows the preferable parameters of each lens in the first lens group 24 and the second lens group 26. In Table 1, "Distance" represents the distance between one surface in a corresponding column and the adjacent surface in the following column, a surface S7 represents an aperture 19 of the projection lens 18, and a surface S12 represents the imaging unit 16.

TABLE 1

|  | Surface | Radius of curvature (mm) | Distance (mm) | Refractive index ($N_d$) | ABBE number ($V_d$) | Focal length (FL) |
|---|---|---|---|---|---|---|
| 28 | S1 | 175.2557 | 1.5 | 1.546538 | 47.228400 | −46.489 |
|  | S2 | 22.21051 | 39.42407 |  |  |  |
| 32 | S3 | 79.15198 | 2.950 | 1.669808 | 54.080300 | 44.649 |
|  | S4 | −47.64884 | 0.2 |  |  |  |
| 34 | S5 | 17.9579 | 3.596904 | 1.618000 | 63.333488 | 40.695 |
|  | S6 | 57.5036 | 7.844158 |  |  |  |
| 19 | S7 | Infinity | 1.369122 |  |  |  |
| 30 | S8 | −30.57466 | 0.65 | 1.80500 | 25.400000 | −14.729 |
|  | S9 | 19.81877 | 1.909891 |  |  |  |
| 36 | S10 | −7692.521 | 4.779544 | 1.605555 | 60.387300 | 21.103 |
|  | S11 | −12.80581 | 23.7930878 |  |  |  |
| 16 | S12 | Infinity |  |  |  |  |

For reducing the manufacturing cost of the projection lens 18 and improving the structural design of the projection lens 18, the present invention could preferably constrain a distance ratio of the projection lens 18 to the imaging unit 16 and a focal length ratio of the first lens group 24 to the second lens group 26, but not limited thereto. For example, a distance between the first lens 28 and the third lens 32 represents $d_1$ (substantially regarded as a front focal length of the projection lens 18), a distance between the fifth lens 36 and the imaging unit 16 represents $d_{bfl}$ (substantially regarded as a back focal length of the projection lens 18), a focal length of the first lens 28 represents $f_1$, and a focal length of the second lens 30 represents $f_2$. In this embodiment, $d_{bfl}/d_1 \leq 1$, and $d_{bfl} \geq 20$ mm. Further, $0.2 \leq |f_2|/|f_1| \leq 0.5$. That is, in practical application, if the distance ratio of the projection lens 18 to the imaging unit 16 is larger than the aforesaid upper limit (i.e. $d_{bfl}/d_1 > 1$), it causes that the overall length of the projection lens 18 is relatively short, the back focal length $d_{bfl}$ of the projection lens 18 is relatively long, and the projection lens 18 needs more lens components to eliminate color aberration of light. Accordingly, the related design and manufacturing costs could be increased. Furthermore, since the first lens group 24 and the second lens group 26 are very close to each other, structural interference between the first lens group 24 and the second lens group 26 could occur easily to cause damage of the projection lens 18 during the projection device 10 performs a focal adjustment operation. On the contrary, if the distance ratio of the projection lens 18 to the imaging unit 16 and the focal length ratio of the first lens group 24 to the second lens group 26 conform to the aforesaid constraints (i.e. $d_{bfl}/d_1 \leq 1$, $d_{bfl} \geq 20$ mm, and $0.2 \leq |f_2|/|f_1| \leq 0.5$), the overall length and the back focal length $d_{bfl}$ of the projection lens 18 could be adjusted appropriately, so as to surely prevent interference between the projection lens 18 and other components (e.g. the imaging unit 16) in the projection device 10 and efficiently reduce the design and manufacturing costs of the projection lens 18. To be noted, as shown in Table 1, considering a plus or minus sign of the focal length of each lens, the focal lengths of the second lens 30, the third lens 32, the fourth lens 34, and the fifth lens 36 are larger than the focal length of the first lens 28. On the other hand, considering an absolute value of the focal length of each lens, the second lens 30 has the minimum focal length. That is, compared with the first lens 28, the third lens 32, the fourth lens 34, and the fifth lens 36, the second lens 30 closest to the aperture 19 could have the maximum refractive power for further eliminating lateral color aberration of light.

Figure 3:
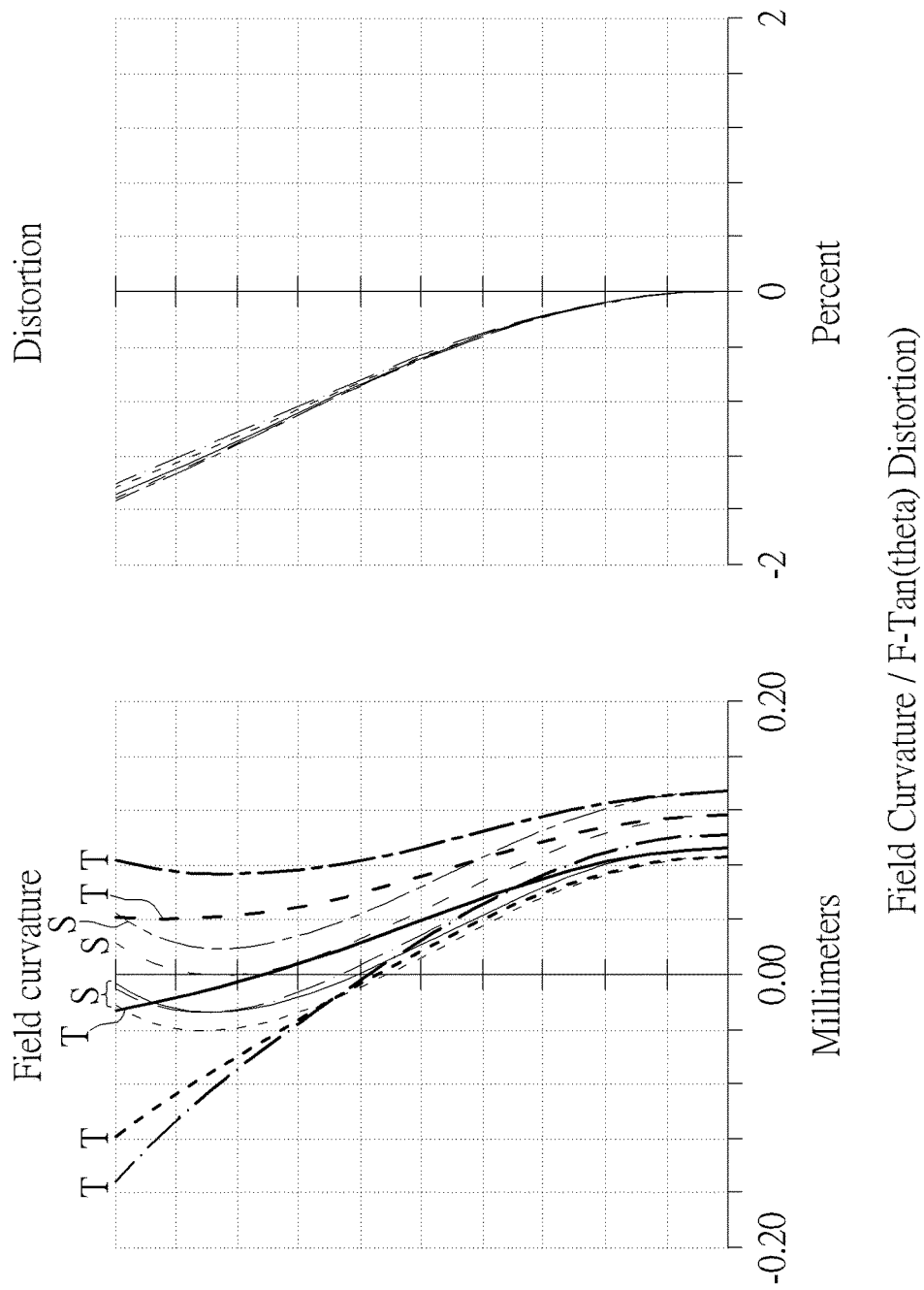
FIG. 3 is a field curvature and distortion simulation diagram of the projection lens in FIG. 2.
Figure 4:
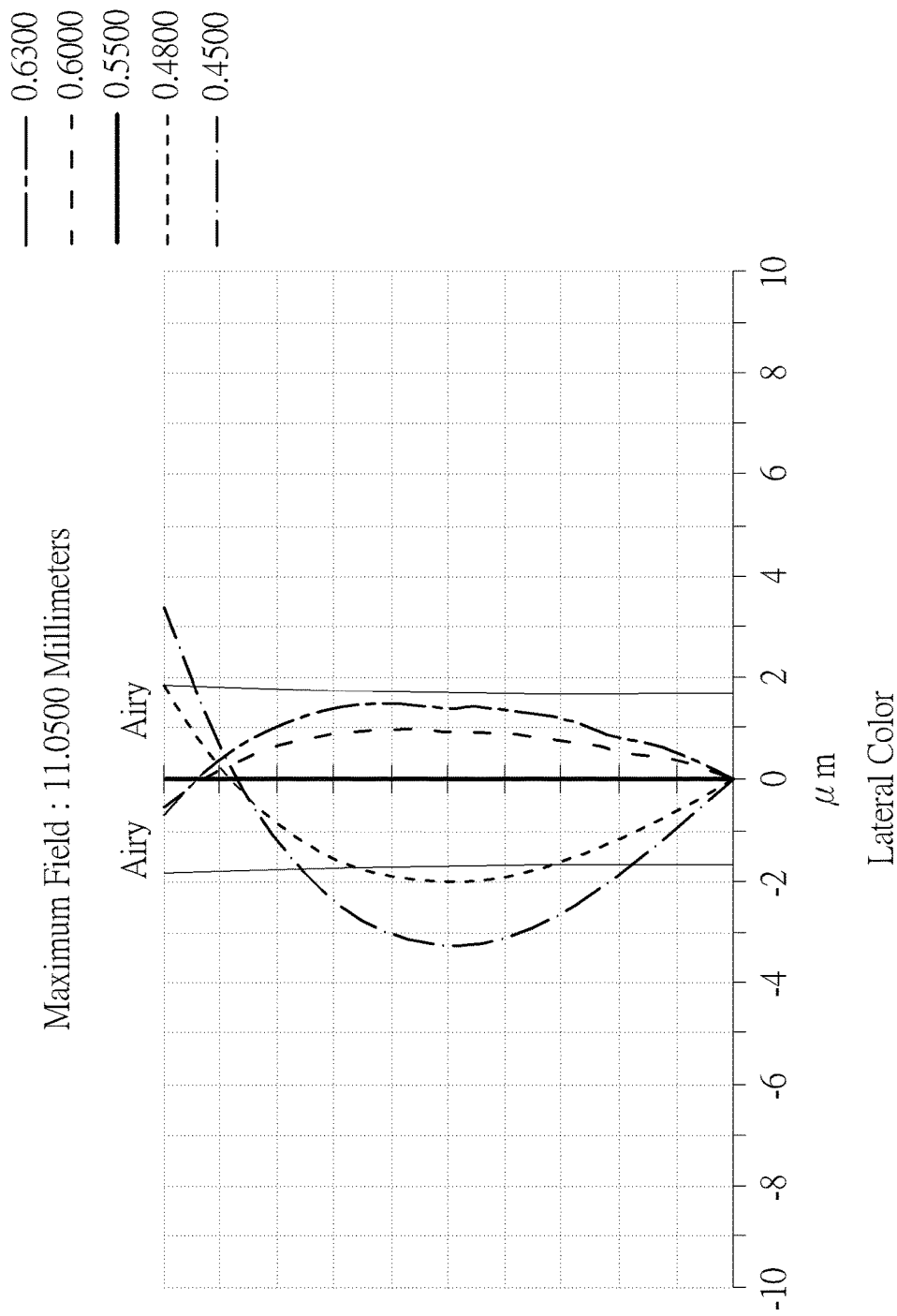
FIG. 4 is a lateral color aberration simulation diagram of the projection lens in FIG. 2.
Figure 5:
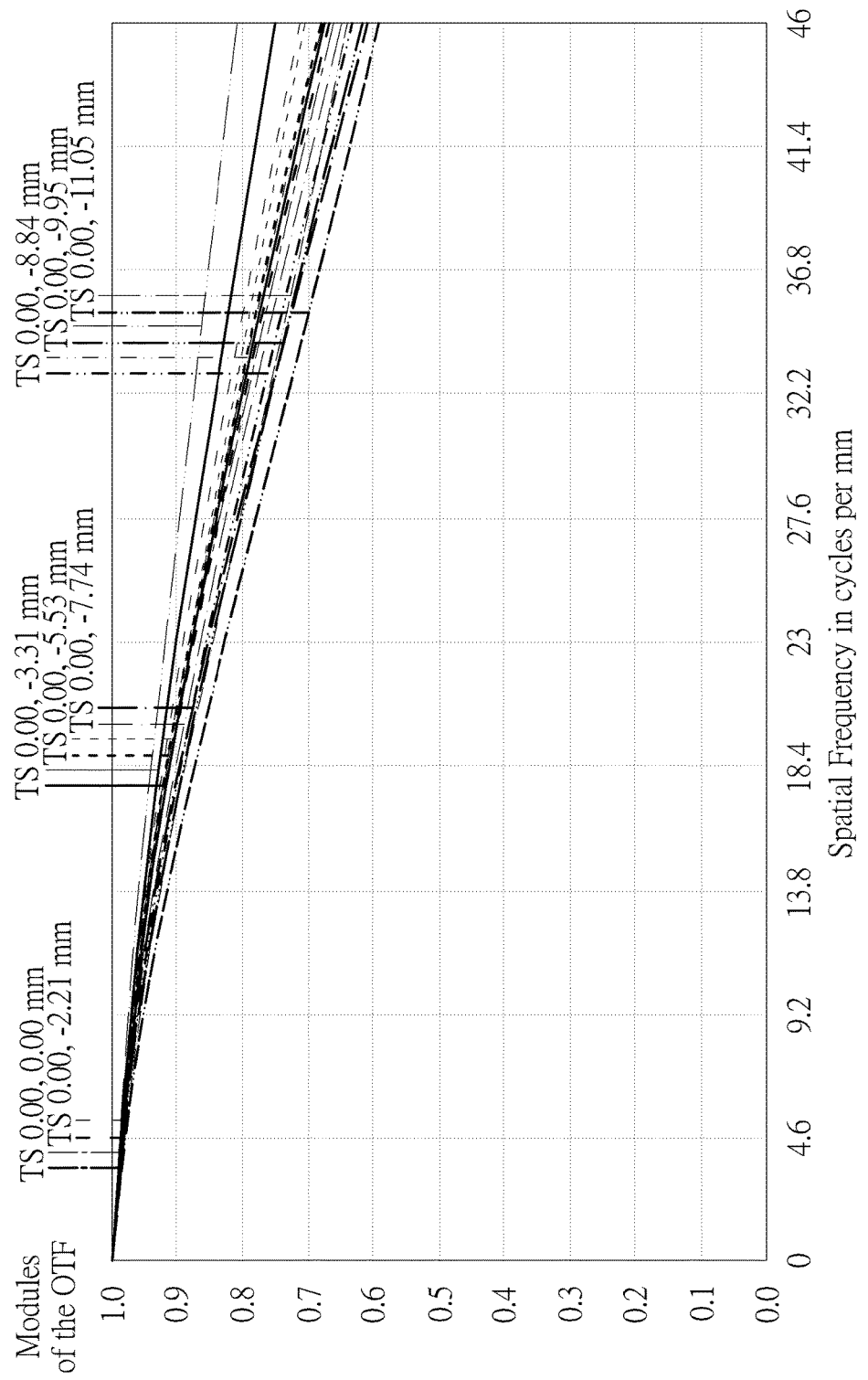
FIG. 5 is a MTF (Modulation Transfer Function) simulation diagram of the projection lens in FIG. 2.

Please refer to FIG. 3, FIG. 4, and FIG. 5. FIG. 3 is a field curvature and distortion simulation diagram of the projection lens 18 in FIG. 2. FIG. 4 is a lateral color aberration simulation diagram of the projection lens 18 in FIG. 2. FIG. 5 is a MTF (Modulation Transfer Function) simulation diagram of the projection lens 18 in FIG. 2. As shown in FIG. 3, FIG. 4, and FIG. 5, the projection lens 18 provided by the present invention not only has a good control on field curvature, image distortion, and lateral color aberration of light, but also has an excellent performance on contrast and sharpness.

In summary, the present invention adopts the lens design that the first lens group with a negative diopter has the first lens with a negative diopter, the second lens group with a positive diopter includes the second lens with a negative diopter, the ABBE number of the first lens is less than 50, and the ratio of the ABBE number of the first lens to the ABBE number of the second lens is between 0.4 and 1.2 (i.e. $0.4 \leq V_{d2}/V_{d1} \leq 1.2$), to efficiently correct image distortion and eliminate lateral color aberration of light, so as to improve the image quality of the projection device and reduce the lens amount of the projection lens.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection lens applied to image projection of a projection device, the projection device being used for projecting images to a screen and comprising an imaging unit, the projection lens comprising:
   a first lens group having a negative diopter, the first lens group being adjacent to the screen and having a first lens, the first lens having a first negative diopter; and
   a second lens group having a positive diopter, the second lens group being adjacent to the imaging unit and comprising a second lens, a third lens, a fourth lens, and a fifth lens, the second lens having a second negative diopter, the third lens and the fourth lens being located between the first lens and the second lens, the fifth lens being located between the imaging unit and the second lens, the fifth lens being an aspherical lens;
   wherein a refractive index of the first lens is less than or equal to 1.64, an ABBE number of the first lens represents $V_{d1}$, an ABBE number of the second lens represents $V_{d2}$, $0.4 \leq V_{d2}/V_{d1} \leq 1.2$, a refractive index of the second lens is larger than or equal to 1.64 and is less than or equal to 1.87, the ABBE number of the second lens is larger than or equal to 20 and is less than or equal to 35, and $V_{d1} < 50$.

2. The projection lens of claim 1, wherein the second lens is made of heavy flint-glass material.

3. The projection lens of claim 1, wherein a distance between the first lens and the third lens represents $d_1$, a distance between the fifth lens and the imaging unit represents $d_{bfl}$, $d_{bfl}/d_1 \leq 1$, and $d_{bfl} \geq 20$ mm.

4. The projection lens of claim 3, wherein a refractive power of the first lens is less than refractive powers of the second lens, the third lens, the fourth lens, and the fifth lens.

5. The projection lens of claim 4, wherein a focal length of the first lens represents $f_1$, a focal length of the second lens represents $f_2$, and $0.2 \leq |f_2|/|f_1| \leq 0.5$.

6. The projection lens of claim 1, wherein a focal length of the first lens represents $f_1$, a focal length of the second lens represents $f_2$, and $0.2 \leq |f_2|/|f_1| \leq 0.5$.

7. A projection device for projecting images to a screen, the projection device comprising:
   a light source for providing light;
   an imaging unit for receiving the light; and
   a projection lens disposed between the imaging unit and the screen for projecting the light to the screen, the projection lens comprising:
     a first lens group having a negative diopter, the first lens group being adjacent to the screen and having a first lens, the first lens having a first negative diopter; and
     a second lens group having a positive diopter, the second lens group being adjacent to the imaging unit and comprising a second lens, a third lens, a fourth lens, and a fifth lens, the second lens having a second negative diopter and being made of heavy flint-glass material, the third lens and the fourth lens being located between the first lens and the second lens, the fifth lens being located between the imaging unit and the second lens, the fifth lens being an aspherical lens;
   wherein an refractive index of the first lens is less than or equal to 1.64, an ABBE number of the first lens represents $V_{d1}$, an ABBE number of the second lens represents $V_{d2}$, $0.4 \leq V_{d2}/V_{d1} \leq 1.2$, and $V_{d1} < 50$.

8. The projection device of claim 7, wherein a refractive index of the second lens is larger than or equal to 1.64 and is less than or equal to 1.87, and the ABBE number of the second lens is larger than or equal to 20 and is less than or equal to 35.

9. The projection device of claim 7, wherein a distance between the first lens and the third lens represents $d_1$, a distance between the fifth lens and the imaging unit represents $d_{bfl}$, $d_{bfl}/d_1 \leq 1$, and $d_{bfl} \geq 20$ mm.

10. The projection device of claim 9, wherein a refractive power of the first lens is less than refractive powers of the second lens, the third lens, the fourth lens, and the fifth lens.

11. The projection device of claim 10, wherein a focal length of the first lens represents $f_1$, a focal length of the second lens represents $f_2$, and $0.2 \leq |f_2|/|f_1| \leq 0.5$.

12. The projection device of claim 7, wherein a focal length of the first lens represents $f_1$, a focal length of the second lens represents $f_2$, and $0.2 \leq |f_2|/|f_1| \leq 0.5$.

* * * * *